(12) United States Patent
Askin et al.

(10) Patent No.: US 8,017,247 B2
(45) Date of Patent: Sep. 13, 2011

(54) SELF CLEANING ALUMINUM ALLOY SUBSTRATES

(75) Inventors: Albert L. Askin, Lower Burrell, PA (US); Verne Bergstrom, Natrona Heights, PA (US); Robert E. Bombalski, New Kensington, PA (US); Paula L. Kolek, Tarentum, PA (US); Nickolas C. Kotow, Bethel Park, PA (US); Marlene A. Thompson, Murrysville, PA (US); Jean Ann Skiles, Gibsonia, PA (US); Luis F. Vega, Cheswick, PA (US); James M. Marinelli, Murrysville, PA (US); Daniel Serafin, Wexford, PA (US)

(73) Assignee: Alcoa Inc., Pittsburgh, PA (US)

( * ) Notice: Subject to any disclaimer, the term of this patent is extended or adjusted under 35 U.S.C. 154(b) by 920 days.

(21) Appl. No.: 11/952,333

(22) Filed: Dec. 7, 2007

(65) Prior Publication Data
US 2008/0241573 A1  Oct. 2, 2008

Related U.S. Application Data

(60) Provisional application No. 60/909,138, filed on Mar. 30, 2007.

(51) Int. Cl.
    *B32B 9/00* (2006.01)
(52) U.S. Cl. .............. 428/469; 428/472; 428/307.3
(58) Field of Classification Search .............. None
    See application file for complete search history.

(56) References Cited

U.S. PATENT DOCUMENTS

| 5,707,915 | A | 1/1998 | Taoda ................. 502/159 |
| 5,753,322 | A | 5/1998 | Yamaguchi et al. ........... 428/14 |
| 5,755,867 | A | 5/1998 | Chikuni et al. .......... 106/287.16 |
| 5,853,866 | A | 12/1998 | Watanabe et al. .......... 428/312.8 |
| 5,874,701 | A | 2/1999 | Watanabe et al. ........ 204/157.15 |
| 5,939,194 | A | 8/1999 | Hashimoto ............... 428/411.1 |
| 5,961,843 | A | 10/1999 | Hayakawa et al. ........... 210/748 |
| 6,013,372 | A | 1/2000 | Hayakawa et al. ........ 428/411.1 |
| 6,037,289 | A | 3/2000 | Chopin et al. .................... 502/2 |
| 6,090,489 | A | 7/2000 | Hayakawa et al. ........... 428/409 |

(Continued)

FOREIGN PATENT DOCUMENTS

JP       9-57912      3/1997

(Continued)

OTHER PUBLICATIONS

Brause et al., *CO2 Chemisorption on Alkalated TiO2(1 0 0)-(1×3) studied with MIES and UPS(HeI)*, Surface Sicence, vol. 476, pp. 78-84, (2001).

(Continued)

*Primary Examiner* — Timothy M Speer
(74) *Attorney, Agent, or Firm* — Greenberg Traurig LLP

(57) ABSTRACT

Self-cleaning aluminum alloy substrates and methods of making the same are disclosed. In one embodiment, a substrate is provided, the substrate including an aluminum alloy body, an anodic oxide zone having micropores within a surface of the aluminum alloy body, the anodic oxide zone being substantially impermeable to contaminants, and a photocatalytic film located on at least a portion of the anodic oxide zone, wherein the photocatalytic film comprises photocatalytically active semiconductor. In one embodiment, a method is provided, the method including the steps of forming an anodic oxide zone in at least a portion of an aluminum alloy base, forming a photocatalytic film, the photocatalytic film being located on the anodic oxide zone, and sealing the anodic oxide zone with a sealant, wherein, as sealed, the anodic oxide zone is substantially impermeable to contaminants.

5 Claims, 4 Drawing Sheets

U.S. PATENT DOCUMENTS

| | | | |
|---|---|---|---|
| 6,165,256 A | 12/2000 | Hayakawa et al. | 106/13 |
| 6,191,062 B1 | 2/2001 | Hayakawa et al. | 502/159 |
| 6,337,129 B1 | 1/2002 | Watanabe et al. | 428/328 |
| 6,368,668 B1 | 4/2002 | Kobayashi et al. | 427/376.2 |
| 6,602,918 B1 | 8/2003 | Ichinose | 516/90 |
| 6,673,433 B1 | 1/2004 | Saeki et al. | 428/323 |
| 6,716,513 B1 | 4/2004 | Hasuo et al. | 428/141 |
| 6,884,752 B2 | 4/2005 | Andrews | 502/349 |
| 7,205,049 B2 | 4/2007 | Andrews | 428/403 |
| 2004/0072684 A1 | 4/2004 | Tsujimichi et al. | 502/242 |
| 2006/0264520 A1 | 11/2006 | Sonezaki et al. | 516/90 |
| 2007/0017567 A1 | 1/2007 | Gronet et al. | 136/246 |
| 2007/0099002 A1 | 5/2007 | Walters et al. | 428/446 |
| 2008/0003367 A1 | 1/2008 | Stratton | 427/372.2 |

FOREIGN PATENT DOCUMENTS

| | | |
|---|---|---|
| JP | 2756474 | 3/1998 |
| JP | 10-156999 | 6/1998 |
| JP | 2924902 | 5/1999 |
| JP | 2939524 | 6/1999 |
| WO | WO0224333 | 3/2002 |
| WO | WO2006038326 | 4/2006 |
| WO | WO2007018147 | 2/2007 |
| WO | WO2007034586 | 3/2007 |

OTHER PUBLICATIONS

Federal Register, vol. 72, No. 126, pp. 35991-35992 (Jul. 2, 2007).

*Photocatalysis Applications of Titanium Dioxide TiO2*, http://www.titaniumart.com/photocatalysis-ti02.html.

*Photocatalytic Oxidation*, Clean Water Programme, http://www.ntu.edu.sg/cwp/pco.htm.

*Pilkington Active: Self-Cleaning Glass*, http://www.pilkington.com/international+products/activ/default.htm, last accessed Jan. 3, 2008.

Richards, B., *Novel Uses of Titanium Dioxide for Silicon Solar Cells*, Thesis-Doctor of Philosophy-University of New South Wales, (2002).

*The Ultimate Comfort: SunClean Self-Cleaning Windows*, http://corporateportal.ppg.com/NA/Glass/ResidentialGlass/ResidentialBuildersRemodelers/ProductInformation/SunClean/.

Commonly-Owned U.S. Appl. No. 11/828,305, pp. 1-39, filed Jul. 25, 2007.

SELF CLEANING ALUMINUM ALLOY SUBSTRATES

CROSS-REFERENCE TO RELATED APPLICATION

This application claims priority under 35 U.S.C. §119(e) to U.S. Provisional Patent Application No. 60/909,138, filed Mar. 30, 2007, which is incorporated herein by reference.

BACKGROUND

For both practical and aesthetic reason, it is often desirable to prevent the buildup of dirt on surfaces. Grime, oil, dust, and mold, for example, in addition to environmental and air emission contaminants adhere to aluminum alloy substrate surfaces used in both outdoor and indoor products. Conventionally, detergents, water and/or mechanical pressure may be used to clean surfaces of dirty aluminum alloy products.

SUMMARY OF THE DISCLOSURE

Broadly, the present disclosure relates to self-cleaning aluminum alloy substrates and methods of producing the same. The self-cleaning substrates may includes an anodic oxide zone and a photocatalytic film. The anodic oxide zone may be sealed to make the zone substantially impermeable to contaminants. The photocatalytic film may promote self-cleaning functionality. The self-cleaning aluminum alloy substrates may actively break down materials that come in constant contact with surfaces of the substrate, such as dirt, grime, oil, dust, and/or mold, to name a few, ("visual detractants") by utilizing sunlight, fluorescent light, blacklight or any other light source at wavelengths above about 300 nm, to photocatalytically break down the visual detractants. The visual detractants may then be removed from the aluminum alloy surface via water (e.g., rain water). In other words, visual detractants may decompose to simple organic or inorganic compounds, which re-enter the atmosphere and/or wash away under the effects of ambient conditions (e.g., heat, wind and/or rain), thus making the aluminum alloy substrates self-cleaning. Use of self-cleaning aluminum alloy substrates provides an easier way to maintain visually appealing aluminum alloy surfaces, and an easier way to clean aluminum alloy substrates, and in the absence of detergents, which may be harmful to the environment, and in the absence of a dedicated water spray, which may waste water.

In one approach, a substrate includes an aluminum alloy base, an anodic oxide zone formed within a portion of the aluminum alloy base, and a photocatalytically active semiconductor film coupled to the anodic oxide zone. The anodic oxide zone may be substantially impermeable to contaminants, which may restrict degradation of the substrate. The anodic oxide zone generally includes micropores, and, in one embodiment, the micropores are from about 5 nm to about 250 nm in diameter. The aluminum alloy base may be any suitable aluminum alloy, and, in one embodiment, the aluminum alloy base is one of a 5XXX series alloy sheet and a 6XXX series forged alloy. The photocatalytically active semiconductor film includes a plurality of photocatalytically active semiconductor particles. In one embodiment, at least some of the particles are titanium dioxide particles. In one embodiment, the semiconductor particles are within at least about 2 microns from the surface of the photocatalytic film. In one embodiment, the anodic oxide zone includes photocatalytically active semiconductor therein. In one embodiment, the semiconductor of the anodic oxide zone is within at least about 2 microns from the surface of the photocatalytic film.

In one embodiment, a sealant is used to seal the anodic oxide zone, thereby forming a continuous or semi-continuous oxide structure within the anodic oxide zone (e.g., within the pores), which may at least partially assist in making the anodic oxide zone substantially impermeable to contaminants. In one embodiment, the sealant is applied after the photocatalytic film has formed and is coupled to the anodic oxide zone. In this regard, the sealant may diffuse through/penetrate at least a portion of the photocatalytic film and the anodic oxide zone. The sealant may be an aqueous based solution, such as any of water alone or water in addition to, but are not limited to, nickel ammonium sulphate, nickel acetate, nickel sulphate, cobalt acetate, cobalt sulphate, nickel/cobalt acetate, sulphate, silicate, sodium silicate and combinations thereof.

In another approach, a substrate includes an aluminum alloy base, an anodic oxide zone, having micropores, within a surface of the aluminum alloy substrate, a polymer film located on at least a portion of the anodic oxide zone, and a photocatalytic film located on at least a portion of the polymer film, wherein the photocatalytic film comprises photocatalytically active semiconductor. In one embodiment, the anodic oxide zone is substantially impermeable to contaminants. The substrate may include a coupling agent film located between the polymer film and the photocatalytic film. In one embodiment, the coupling agent film comprises photocatalytically active semiconductor therein. In one embodiment, the anodic oxide zone includes photocatalytically active semiconductor therein. In one embodiment, the polymer film contains silicon (e.g., a siloxane-based film or a silazane-based film). In one embodiment, the photocatalytic film is a silicon-containing, photocatalytically active film.

In another approach, a substrate comprises an aluminum alloy base, an aluminum oxide film (e.g., a non-anodic oxide film) formed on a surface of the aluminum alloy base, and a photocatalytically active semiconductor film coupled to the aluminum oxide film. In one embodiment, the aluminum oxide film has a thickness of not greater than about 800 nanometers.

In another approach, a method includes the steps of forming an anodic oxide zone in at least a portion of an aluminum alloy base, forming a photocatalytic film on the anodic oxide zone, and sealing the anodic oxide zone with a sealant, wherein, as sealed, the anodic oxide zone is substantially impermeable to contaminants. The sealing step may occur after the photocatalytic film has been formed. The sealant may be a solution comprising water, nickel ammonium sulphate, nickel acetate, nickel sulphate, cobalt acetate, cobalt sulphate, nickel/cobalt acetate, sulphate silicate, sodium silicate or combinations thereof.

In yet another approach, a method includes the steps of forming an anodic oxide zone within at least a portion of an aluminum alloy base, forming a polymer film located on at least a portion of the anodic oxide zone, sealing, concomitant to the forming a polymer film step, the anodic oxide zone, thereby making the anodic oxide zone substantially impermeable to contaminants, and forming a photocatalytic film, wherein the photocatalytic film is located on at least a portion of the polymer film. In one embodiment, the method includes forming a coupling agent film, wherein the coupling agent film is located between at least a portion of the polymer film and the photocatalytic film. In one embodiment, the coupling agent film includes photocatalytically active semiconductor.

In another approach, a method includes the steps of cleaning an aluminum alloy base with a cleaner, thereby forming an aluminum oxide layer on the aluminum alloy base, and applying a solution having a photocatalytically active semiconductor to the aluminum oxide film, thereby forming a photocatalytically active semiconductor film, wherein the photocatalytically active semiconductor film is adherent to the aluminum alloy base. In one embodiment, the cleaner is one of an alkaline cleaner, an acidic cleaner and combinations thereof. In one embodiment, the method includes the steps of chemically brightening and then desmutting the aluminum alloy base before the applying the solution step.

The above films may be formed via various conventional processes/methods, such as spraying, dipping, roll coating, reverse roll coating, and the like. Furthermore, various drying (e.g., air drying), rinsing (e.g., via water and/or deionized water) and/or curing steps may be completed to facilitate production of the films and the substrate. Additionally, various ones of the aspects, approaches and/or embodiments noted hereinabove may be combined to yield various self-cleaning aluminum alloy substrates. Moreover, various method steps may be completed in various suitable orders to produce self-cleaning aluminum alloy substrates. These and other embodiments of the disclosure will become more apparent through the following description and drawings.

BRIEF DESCRIPTION OF THE DRAWINGS

For a fuller understanding of the disclosure, reference is made to the following description taken in connection with the accompanying drawing(s), in which.

DETAILED DESCRIPTION

Figure 1:
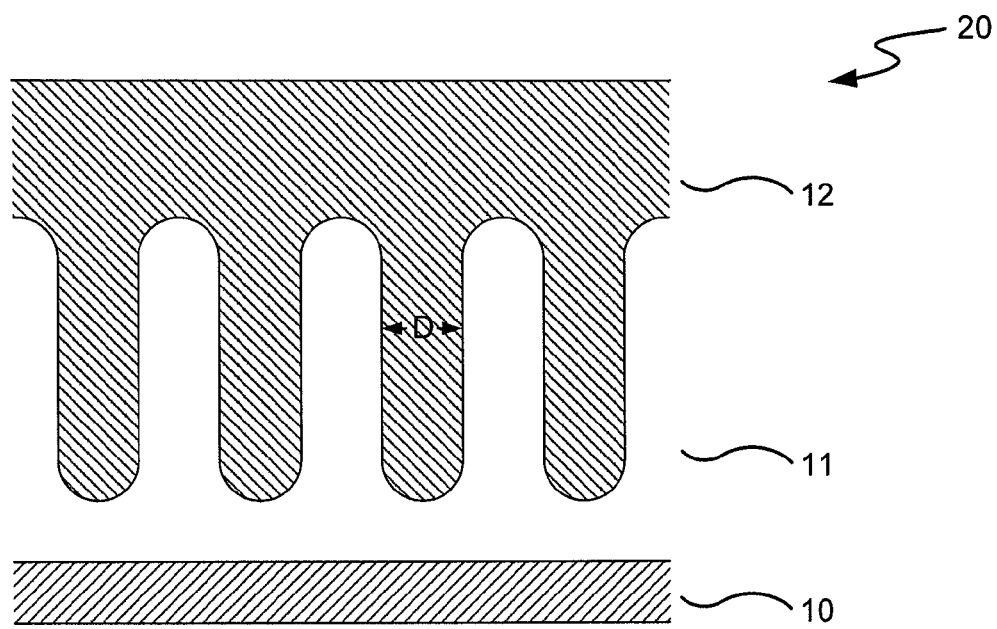
FIG. 1 is an enlarged fragmentary sectioned perspective view showing a first embodiment of the self-cleaning aluminum alloy substrate in accordance with the present disclosure.

The instant disclosure relates to self-cleaning aluminum alloy substrates and methods of making the same. The self-cleaning substrates may include a photocatalytic coating film that is produced via a binder that is free of organic or silicon-based materials (such materials usually require heating and/or curing). The photocatalytic coating may be adherent to the surface of an aluminum alloy base.

As used herein, the term "self-cleaning" means the property of a surface that generally keeps the surface clean without mechanical force or detergent to loosen and remove visual detractants.

As used herein, the term "aluminum alloy" means an aluminum metal with soluble elements either in the aluminum lattice or in a phase within aluminum. Elements may include aluminum, copper, iron, magnesium, nickel, silicon, zinc, chromium, manganese, titanium, vanadium, zirconium, tin, scandium, lithium. Elements are added to influence physical properties of the aluminum alloy and performance characteristics.

As used herein, the term "aluminum oxide layer" means a volume predominately containing aluminum oxide. Aluminum oxide layers may be formed, for example, via anodizing (e.g., via contacting an aluminum metal with an acid or a mixed acid solution in the presence of current) to create an anodic oxide zone within an aluminum alloy base, or aluminum oxide layers may be formed via cleaners that allow the surface of an aluminum metal to react with gaseous oxygen (e.g., air). An anodic oxide zone may include a porous layer which may vary in thickness depending upon processing/treatment conditions. The pores of the anodic oxide zone may be micropores (e.g., pores having a diameter of from about 5-250 µm) and the pores may be sealed or filled to create a continuous or semi-continuous oxide structure within the pores for durability of the anodic oxide zone. The anodic oxide zone may be filled with dyes, polymers and/or primers for adhesion or appearance. A non-anodized aluminum oxide film (e.g., a native oxide) is generally non-porous and has a thickness of not greater than about 800 nanometers.

As used herein, the term "sealant" means a water-based solution used to fill the pores of the anodic oxide zone to create a continuous or semi-continuous oxide structure within the pores. The sealant generally makes the anodic oxide zone substantially impermeable to contaminants.

As used herein, the term "substantially impermeable to contaminants" means that the anodic oxide zone passes the Stain Test defined by ASTM B136-84 (2003), entitled "Standard Method for Measurement of Stain Resistance of Anodic Coatings on Aluminum."

As used herein, the term "photocatalysis" means the use of light to excite a catalyst on a surface to release energy. The catalyst is not consumed by this reaction. The energy released from the catalyst is used to start a reaction, or reaction sequence. Semiconductors can have photocatalytic properties.

As used herein, the term "semiconductor" means any of various solid crystalline substances, such as germanium, titanium, indium or silicon, or the oxides of these crystalline substances, having electrical conductivity greater than insulators. Semiconductors are distinguished from insulators by a band gap energy. Band gap energy is the energy that electrons must have to move from a valence band to a conduction band. There is an arbitrary band energy assigned of 4.0 electron volts (ev) to separate semiconductors from insulators. Semiconductors have a band gap of less than or equal to 4.0 electron volts. Titanium dioxide in the anatase crystalline form has a band gap of 3.2 ev.

As used herein, the term "laminate" means a multilayer structure chemically or mechanically bonded together.

As used herein, the term "composite" means two or more materials chemically or mechanically bonded together.

As used herein, the term "aluminum composite panel" means an aluminum layer or aluminum layers bonded to a non-aluminum surface.

As used herein, the term "coupling agent" or "tie layer" means a chemical compound with a preference to bond two chemically incompatible surfaces.

As used herein, the term "peroxotitanic acid (PTA)" and/or "peroxo-modified anatase (PA) sol" means an aqueous coating composition comprising a titanium oxide forming solution.

As used herein, the term "brightening" means a method to chemically polish an aluminum alloy surface to smooth the surface in some cases. To brighten the aluminum alloy, an acid or mixed acid may be used with an addition of chromium and/or copper.

As used herein, the term "deoxidize" means a cleaning process to remove oxide and elements from an alloyed and heat treated aluminum alloy surface.

As used herein, the term "titanium dioxide layer" means a coating containing titanium dioxide particles with particle sizes in the 10-50 nm range (generally). The coating may also contain clay, mineral, alkali and/or other semiconductor(s).

As used herein, the term "coupled to" means joined to another surface. For example, a photocatalytically active film may be at least partially coupled to an anodized aluminum oxide layer via the physical interaction between the pores of the anodized layer and portions of the film located in those pores. In one embodiment, a first material may be coupled to a second material, and the first material may also be adherent to the second material.

As used herein, the term "adherent to" means that a surface is capable of passing the Scotch 610 tape pull test, as defined by ASTM D3359-02, Aug. 10, 2002.

FIGS. 1-5 illustrate various embodiments of self-cleaning aluminum alloy substrates. In FIG. 1, the self-cleaning aluminum alloy substrate 20 includes an anodic oxide zone 11 having micropores on the surface of an aluminum alloy base 10, a photocatalytically active semiconductor film 12 located on the anodic oxide zone 11. Methods of producing substrate 20 are described below.

The aluminum alloy base 10 may include any suitable aluminum alloy, including non-heat treatable metals and heat treatable metals including, but not limited to, 1XXX, 2XXX, 3XXX, 4XXX, 5XXX, 6XXX, 7XXX, and 8XXX aluminum alloys (Aluminum Association designations). In one embodiment, the aluminum alloy base contains at least one of a 5657 or a 6061 series alloy.

The anodic oxide zone 11 is an insulating film and has in the surface thereof a microporous texture having an undulating contour and numerous micropores having diameters in the approximate range of about 5 nm to about 250 nm. As a result, the microporous structure serves to anchor the photocatalytically active semiconductor film 12 to the aluminum alloy base 10 and enhance adhesion between the photocatalytically active semiconductor film 12 and the aluminum alloy base 10. Micropore diameters can be measured by Scanning Electron Microscopy (SEM) of the anodic oxide zone 11. This SEM provides a micrograph of the surface and a calibrated method to measure pore diameter. Micropore depth is measured by cross-section of the anodized aluminum alloy surface and examination by either SEM or Transmission Electron Microscopy (TEM). In one embodiment, at least some of the pores have a depth of from about 10 µm to about 50 µm.

The photocatalytically active semiconductor film 12 may include a plurality of a photocatalytically active semiconductor fine particles. The particles may be uniformly dispersed within the film 12 or may be non-uniformly dispersed in the film 12. The particles are located in the film 12 so that at least a portion of the fine particles are partially exposed to the environment through the surface of the film 12 so as to facilitate self-cleaning functionality. In one embodiment, titanium dioxide is used as the photocatalytically active semiconductor. Titanium dioxide may be used in the form of particles or powder, or in the form of a sol. Suitable types of photocatalytically active $TiO_2$ semiconductors that may be used include, but are not limited to, anatase, rutile and brookite crystalline forms of titanium dioxide or combinations thereof. In one embodiment, the photocatalytically active semiconductor film 12 is a titanium dioxide layer, where the titanium dioxide particles are in a size range of about 10 to about 50 nm. The film 12 may also contain clay, minerals, alkali and/or other semiconductors.

It is believed that the mechanism of the photocatalytically active semiconductor works as follows: once the photocatalytically active semiconductor, for example $TiO_2$, is illuminated by ultraviolet light with a wavelength above about 300 nm, electrons in the valence band are excited to the conduction band. When the electrons return to their lower energy state, energy is emitted and interacts with water vapor or oxygen molecules to form hydroxyl radicals and super oxide anions, respectively. Both the hydroxyl radicals and superoxide anions are strong oxidizing species, which can react and breakdown organic pollutants into simpler, lower molecular weight, oxidized products.

To make the anodic oxide zone 12 substantially impermeable to contaminants, a sealant is used to seal the anodic oxide zone. Sealing the anodic oxide zone may restrict the anodic oxide zone 11 from becoming dirty and/or corrosion of the aluminum alloy base 10. Suitable types of solutions that may be used as the sealant include either water alone or water in addition to, but are not limited to, nickel ammonium sulphate, nickel acetate, nickel sulphate, cobalt acetate, cobalt sulphate, nickel/cobalt acetate, sulphate, silicate, sodium silicate and combinations thereof. By utilizing the sealant after the film has formed, it is believed that the pores of the anodic oxide zone are sealed. Thus, after sealing, the anodic oxide zone may include a continuous or semi-continuous oxide structure within the pores that at least partially assists in making the anodic oxide zone substantially impermeable to contaminants.

The photocatalytically active semiconductor film 12 may be highly adhesive to the base 10 because the photocatalytically active semiconductor film 12 may be contiguous and may chemically and/or physically bond with the aluminum alloy base 10 via the micropores of the anodic oxide zone 11. In one embodiment, all, or nearly all, of the film 12 is adherent to the base 10. In one embodiment, the film performs just as well as standard Type II anodized aluminum in a copper-accelerated acetic acid salt spray test (CASS), as defined by ASTM B368-97 (2003)e1. In one embodiment, a substrate comprising the film 12 and the base 10 are capable of passing a Thermal Shock Test, as defined by GM Test 9525P. In one embodiment, the photocatalytically active semiconductor particles inside the micropores of the anodic oxide zone 11 are within at least about 2 microns of the top surface of the substrate 20. In one embodiment, the photocatalytically active semiconductor film 12 includes photocatalytically active semiconductor $TiO_2$ in the form of anatase $TiO_2$ or peroxotitanic acid.

The substrate 20 can be used in various applications such as, for example, aluminum alloy foams, forgings, sheets, and extrusions. In one embodiment, the aluminum alloy is for material surfaces to include facades, shower and bath enclosures, and surfaces of laminates and composites, where the top layer of the laminate or composite can be bare, anodized or painted aluminum alloy. The substrate 20 can be used, for example, in transportation applications, such as wheels, autobody, fuel tanks, tread plate, rail car interior and exterior surfaces, architectural applications, such as aluminum siding, and in consumer applications such as lighting sheet, appliances, and electronics.

Figure 2:
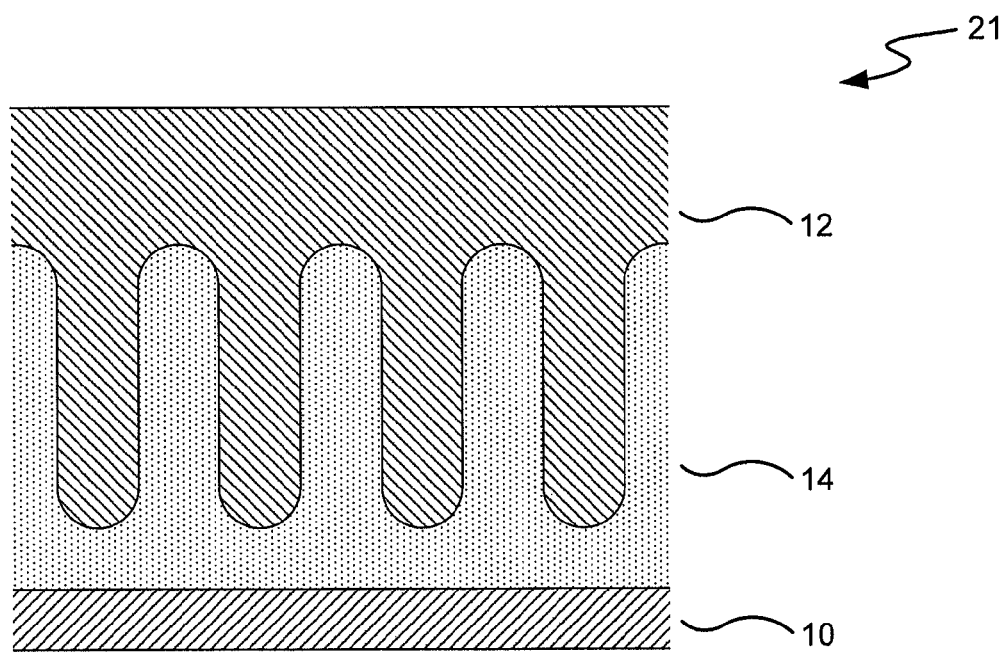
FIG. 2 is an enlarged fragmentary section perspective view showing a second embodiment of the self-cleaning aluminum alloy substrate in accordance with the present disclosure.
Figure 3:
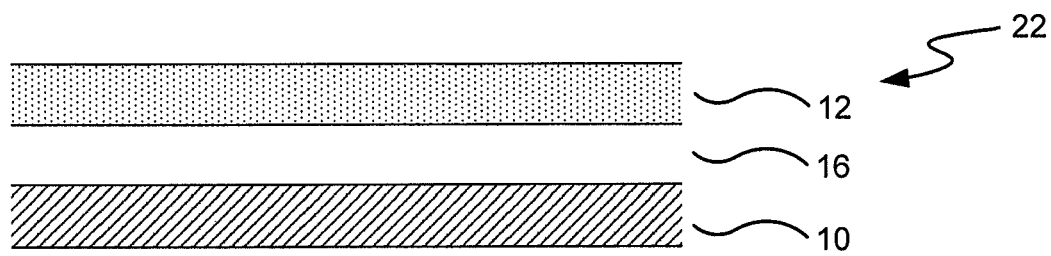
FIG. 3 is an enlarged fragmentary sectioned perspective view showing a third embodiment of the self-cleaning aluminum alloy substrate in accordance with the present disclosure.

In another embodiment, and with reference to FIG. 2, a self-cleaning aluminum alloy substrate 21 may include photocatalytically active semiconductor directly within the anodic oxide zone 14. In the illustrated embodiment, the self-cleaning aluminum alloy substrate 21 includes the anodic oxide zone 14 having a photocatalytically active semiconductor therein (e.g., such as $TiO_2$). The aluminum alloy base 10 may be anodized with semiconductor particles in the anodizing solution to anodize and deposit particles simultaneously to produce the anodic oxide zone 14. A photocatalytic film 12 may be coupled to the anodic oxide zone. Methods of making substrate 21 are described below.

In another embodiment, a self-cleaning aluminum alloy substrate includes an aluminum oxide film not produced via anodizing. For example, and with reference to FIG. 3, a self-cleaning aluminum alloy substrate 22 is made by cleaning the aluminum alloy base 10 with a non-etching alkaline and/or acidic cleaner to form an aluminum oxide film 16 (e.g., a native oxide film) on the aluminum alloy base 10. The aluminum oxide film 16 is generally less than about 800 nanometers thick. A photocatalytically active semiconductor film 12 may be located on the oxide layer 16. Methods of making substrate 22 are described below.

Figure 4A:
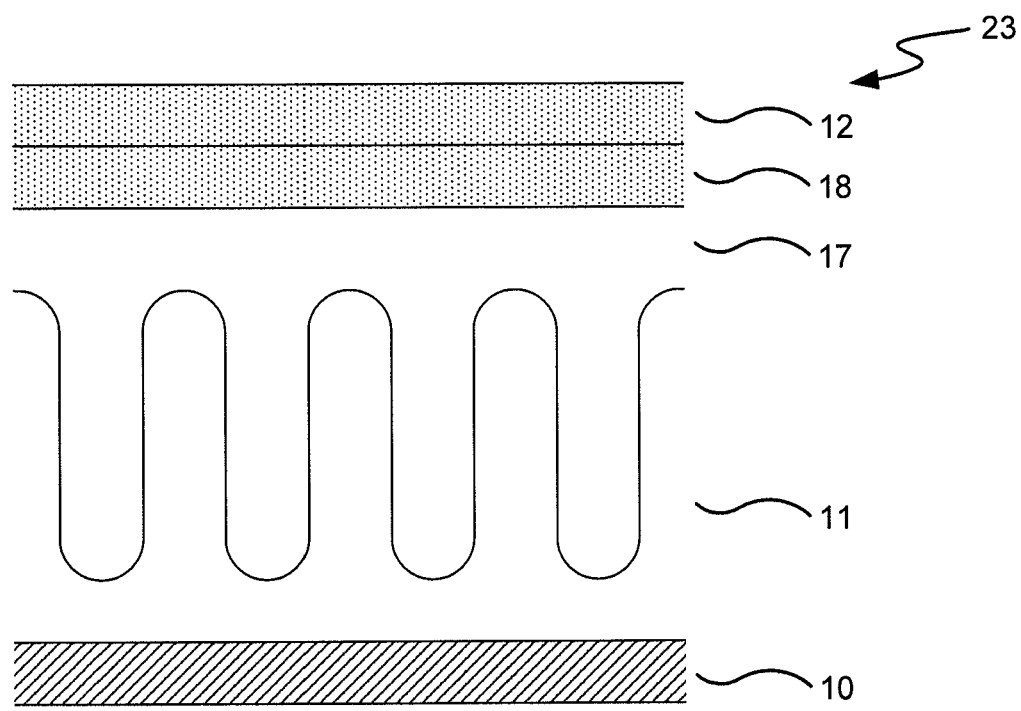
FIGS. 4A and 4B are an enlarged fragmentary sectioned perspective view showing different variations of a fourth embodiment of the self-cleaning aluminum alloy substrate in accordance with the present disclosure.
Figure 4B:
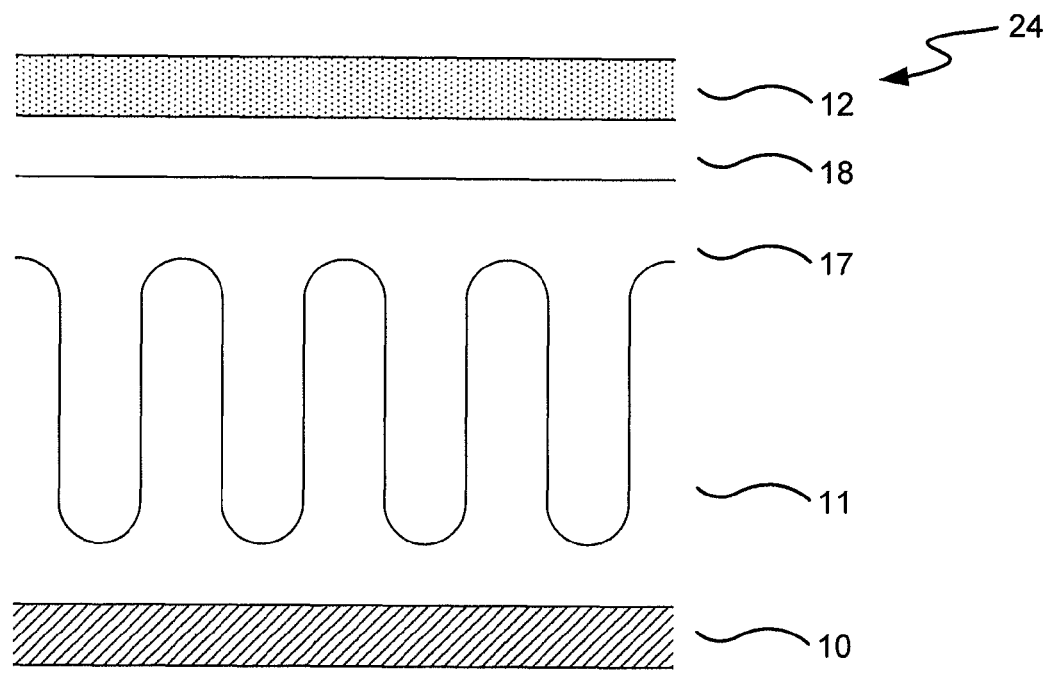
Figure 5:
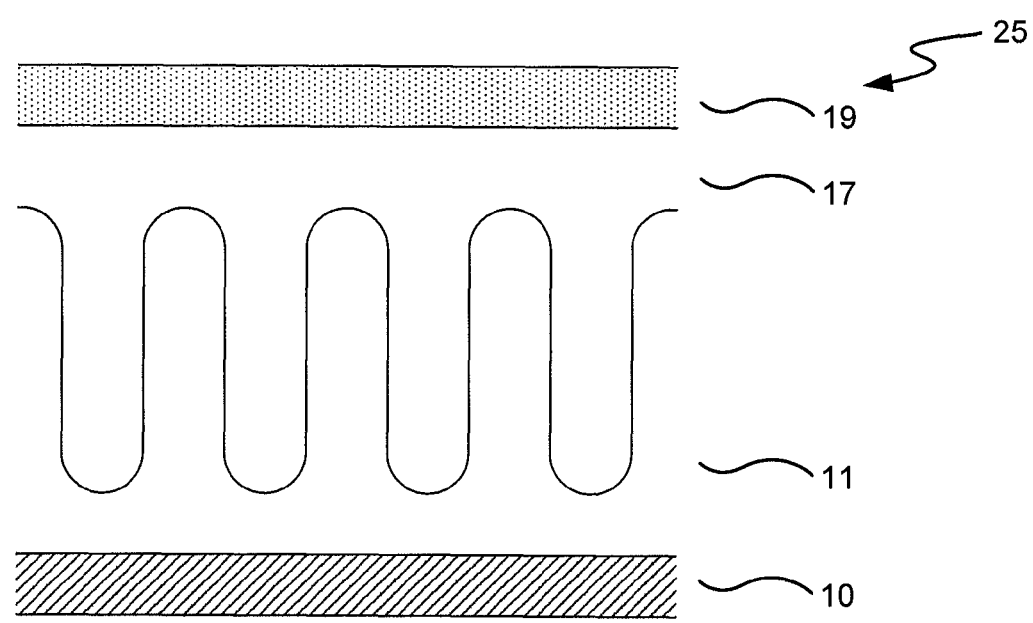
FIG. 5 is an enlarged fragmentary sectioned perspective view showing a fifth embodiment of the self-cleaning aluminum alloy substrate in accordance with the present disclosure.

In one embodiment, polymer layers may be utilized in conjunction with the self-cleaning substrate. For example, and with reference to FIGS. 4A and 4B, the self-cleaning aluminum alloy substrates 23 and 24, respectively, may include an anodic oxide zone 11 having micropores formed on a surface of the aluminum alloy base 10, a polymer film containing silicon 17 (e.g., polysiloxane, polysilazane) located/deposited on the anodic oxide zone 11, a coupling agent film 18 located/deposited on the polymer film containing silicon 17, and a photocatalytically active semiconductor film 12 located/deposited on the coupling agent film 18. The coupling agent film 18 may optionally include photocatalytically active semiconductors therein. FIG. 4A shows an embodiment where the coupling agent film 18 includes a photocatalytically active semiconductor. FIG. 4B shows another embodiment where the coupling agent film 18 does not include a photocatalytically active semiconductor. Similar to as described above for the sealant, the solution used to produce the polymer film may create a continuous or semi-continuous oxide zone within the pores of the anodic oxide zone, thereby at least partially assisting in making the anodic oxide zone substantially impermeable to contaminants. Methods of making substrates 23, 24 are described below.

The polymer film 17 may comprise, for example, polysiloxanes and/or polysilazanes. Suitable siloxane compositions include those sold commercially by SDC Coatings Inc. of Anaheim, Calif., U.S.A. under their SILVUE brand. Other suitable manufacturers of siloxane coatings include Ameron International Inc., and PPG Industries, Inc. In one embodiment, product polymerizations occur at ambient temperature for reducing the impact, if any, to metal surface microstructure. Suitable silazane compositions include those sold commercially by Clariant Corporation of Charlotte, N.C., U.S.A.

The purpose of the coupling agent film 18, also referred to as a tie layer, is to couple/adhere the photocatalytically active semiconductor film 12 to the polymer film containing silicon 17. In some embodiments, the polymer film containing silicon 17 may be hydrophobic in character. Since the coupling agent film 18 is both hydrophilic and hydrophobic in character, it may facilitate adhesion between the photocatalytic film 12 and the polymer film containing silicon 17. Thus, a hydrophilic, photocatalytically active semiconductor film 12 may be adherent to a polymer film via the coupling agent film 18. In other embodiments, the polymer layer 17 may be hydrophilic (e.g., a polysilazane polymer) and thus, a coupling agent film 18 may not be necessary. Suitable compositions used to produce coupling agent films include those in the Toto Hydrotect family of coatings marketed by Nagase Ltd. in the United States. As above, a sealant may be used to seal the anodic oxide zone to make it substantially impermeable to contaminants.

In other embodiments, non-$TiO_2$ photocatalytic films may be used. For example, and with reference to FIG. 5, a self-cleaning aluminum alloy substrate 25 may include an anodic oxide zone 11 having micropores formed on a surface of aluminum alloy base 10, a polymer film containing silicon 17 located/deposited on the anodic oxide zone 11, and a silicon-containing film 19 having a photocatalytically active semiconductor located/deposited on the polymer film containing silicon 17. Suitable silicon-containing films 19 may be produced from compositions available in the Toto Hydrotect family of coatings marketed by Nagase Ltd. in the United States. Methods of making substrate 25 are described below.

Figure 6:
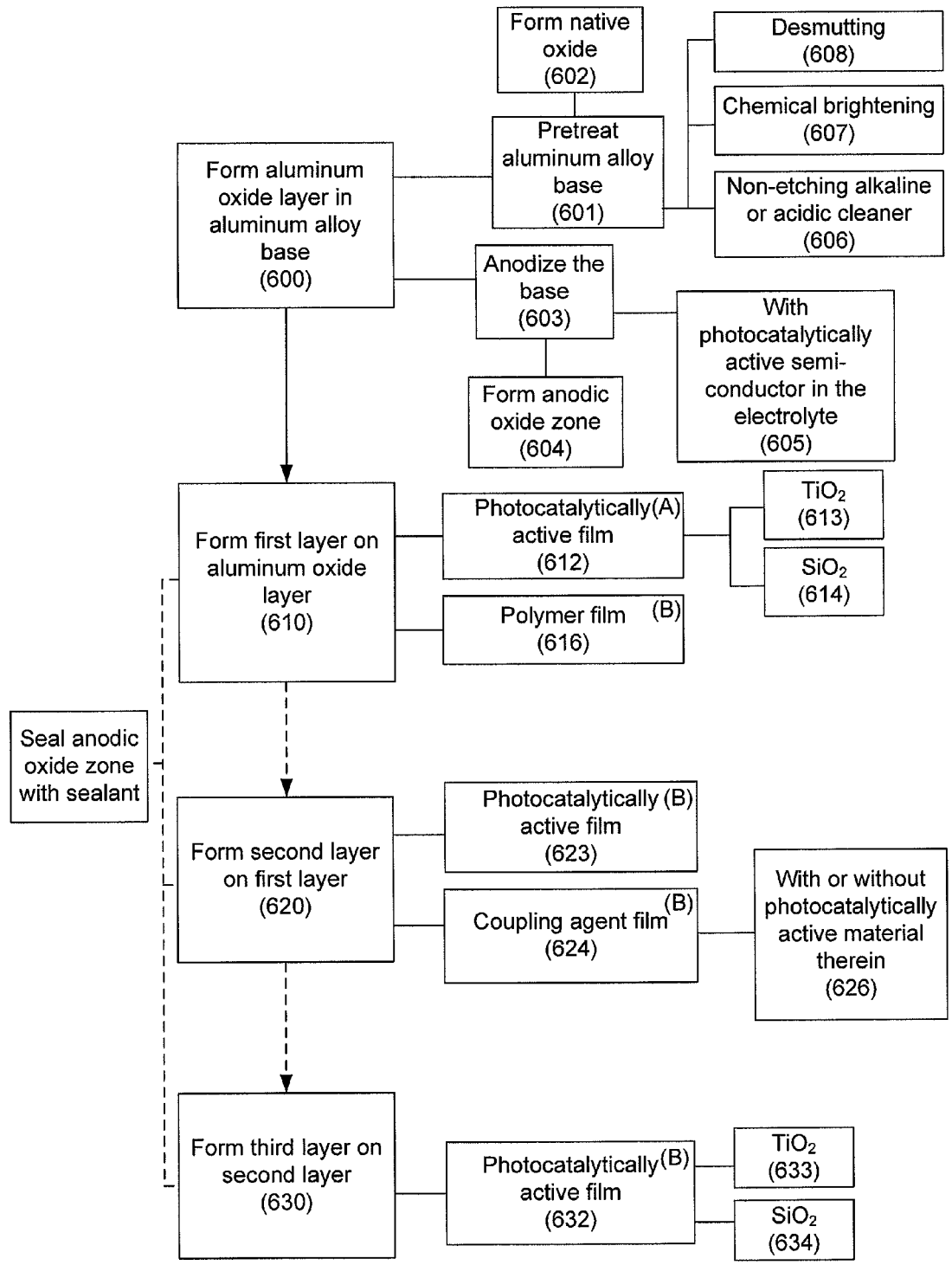
FIG. 6 illustrates one embodiment of producing self-cleaning aluminum substrates according to the present invention.

Methods of producing self-cleaning aluminum substrates are also provided, one embodiment of which is illustrated in FIG. 6. In the illustrated embodiment, the method includes the steps of forming an aluminum oxide layer in an aluminum alloy base (600), forming a first layer on the aluminum oxide layer (610), optionally forming a second layer on the first layer (620), and optionally forming a third layer on the second layer (630).

The forming the aluminum oxide layer step (600) may include pretreating the aluminum alloy base (601) to form a native oxide layer (602). Alternatively, the forming the aluminum oxide layer may include anodizing an aluminum base (603). With respect to the pretreating step (601), any one of a cleaning via non-etching alkaline and/or acidic cleaner (606), chemical brightening (607) and/or desmutting operation (608) may be completed. The pretreating the aluminum alloy base step (601) generally includes formation of a native oxide layer (602). In particular, the aluminum alloy base may be cleaned by an alkaline and/or acidic cleaner and rinsed (e.g., before the anodizing process). Optionally, after alkaline and/or acidic cleaning and rinsing, the base may be chemically brightened (e.g., to remove roughness, as described below) and desmutted followed by a step of rinsing. Typically, in the rolling processes used to produce aluminum sheets, a roughness is imparted to the surface by the roll and creates peaks and valley surface topography. Chemical brightening is designed to remove the peaks preferentially from the metal surface, thus smoothing the surface. This may be accomplished by placing the aluminum base in a chemical solution of one or a mixture of acids, such as chromic, nitric, or phosphoric acid. The location of metal removal is targeted mainly for the peaks by masking the valleys during the etching process. After chemical brightening, there may be oxides and metals on the surface of the smoothed surface. These oxides and metals may be removed from solution and onto the brightened surface. To remove these materials from the brightened surface, the metal may be subjected to a desmutting operation typically involving contacting the base with a 50% by volume nitric acid dilution, followed by a rinse to remove the acid residual. "Non-etching cleaner" is defined as removing a rolling lubricant that does not remove underlying metals. Suitable types of non-etching cleaners that may be used include, but are not limited to, alkaline and/or acidic cleaners, such as A31 K as sold by Henkel Surface Technologies.

With respect to the anodizing step (603), the anodizing may be completed via any conventional processes. The anodizing the aluminum base step (603) generally includes production of an anodic oxide zone. The anodizing step (603) may include contacting the aluminum alloy base with an electrolytic solution formed of an inorganic acid, such as sulfuric acid, chromic acid, or phosphoric acid, an organic acid such as oxalic acid, sulfosalicylic acid, or malonic acid, or a mixture thereof in the presence of current, to form the anodic oxide zone (604) possessed of micropores. In one embodiment, the anodic oxide zone is formed via conventional Type II anodizing in a sulfuric acid electrolyte. After the anodizing process, the aluminum alloy base may be rinsed with water and air dried before forming a photocatalytically active semiconductor film or a polymer layer on the anodic oxide zone. In one embodiment, the anodizing step includes anodizing the aluminum base with photocatalytically active semiconductor in the electrolyte solution so as to facilitate inclusion of photocatalytically active semiconductor within the anodic oxide film (605).

With respect to forming the first layer on the aluminum oxide layer (610) step, the first layer may be any suitable layer, such as a photocatalytically active film (612), or a polymeric film (614). The photocatalytic film may include, for example, $TiO_2$ (613) and/or $SiO_2$ (614) materials to facilitate photocatalytic activity. The photocatalytically active film may be formed via any conventional methods. For example, the photocatalytically active semiconductor film may be formed from a colloid containing the semiconductor particles. Thus, in one approach, the film is a carrier of the photocatalytically active semiconductor. Suitable types of solvents used for suspending the photocatalytically active semiconductor in solution include, but are not limited to, alcohol and water. In one embodiment, the solution also contains silicon. Suitable types of colloids that may be used in the present disclosure include, but are not limited to, the TPX family of coatings as sold by Kon Corporation, and the Toto's Hydrotect family of coatings. These colloids are marketed in the United States by Green Millennium and Nagase Ltd., respectively. The colloid containing the photocatalytically active semiconductor can be applied by any conventional or developed methods such as, for example, spraying, dipping, roll coating and reverse roll coating, to name a few. In one approach, the photocatalytically active semiconductor film can be produced by applying a coating to the anodic oxide zone of the aluminum alloy base. Similarly, the polymeric film may be formed via any conventional methods. In one embodiment, polymer films containing silicon are formed by spraying a solution containing the polymer using finely dispersed droplets. Control and dispersion of these droplets via an airless spray atomization minimizes exposure with air from conventional paint spraying methods and may achieve a more suitable breakdown of silicon dispersions in the solvent. The end result may be a thin, highly transparent, "orange peel"-free durable coating.

To make the anodic oxide zone substantially impermeable to contaminants, the anodic oxide zone is sealed (615) after the photocatalytic film has been produced (e.g., dried), or as the polymer film is produced. In one embodiment, a substrate comprising the anodic oxide zone and the photocatalytic film is contacted by a sealant to seal the anodic oxide zone. For example, the substrate may be immersed in a aqueous solution and then dried to seal the anodic oxide zone. In this regard, the sealant may penetrate the photocatalytic film and the anodic oxide zone and form a continuous or semi-continuous oxide structure within the anodic oxide zone, which may at least partially assist in making the anodic oxide zone substantially impermeable to contaminants. In another embodiment, the solution used to produce the polymer film seals the anodic oxide as the polymer film is formed.

With respect to the optional forming the second layer on the first layer (620) step, the second layer may be, for example, another photocatalytically active film (623), or a coupling agent film (624). The photocatalytically active film may be formed via any conventional methods. The coupling agent film may be formed via various conventional methods, such as via coating, for example, by spraying, dipping, roll coating and reverse roll coating, to name a few. The coupling agent film can be formed between the polymer film containing silicon, and the anodic oxide zone on the surface of aluminum alloy base. In one embodiment, the coupling agent film is formed with a solution comprising photocatalytically active material (626). In another embodiment, the coupling agent film is formed via solution that does not contain any photocatalytically active material (626). At any appropriate step, the anodic oxide zone may be sealed with a sealant to make the anodic substantially impermeable to contaminants.

With respect to the optional forming the third layer on the second layer step (630), the third layer may be a photocatalytically active film (632) formed on a coupling agent film (624). The photocatalytically active film (632) may include semiconductor material, such as $TiO_2$ (633) and/or $SiO_2$ (634). The photocatalytically active film (632) may be formed any conventional methods, as described above. At any appropriate step, the anodic oxide zone may be sealed with a sealant to make the anodic substantially impermeable to contaminants.

In the illustrated embodiment, the first, second, and/or third layers may be any suitable layers. However, if the first layer is the photocatalytic film (612), as represented by (A) in this case, a second or third layer is generally not included on the substrate. Similarly, if the first layer is a polymeric film (616), as represented by (B) in this case, the second layer may be either a coupling agent film (624) (B), such as when the polymeric film is hydrophobic, or the second layer may be a photocatalytic film (623) (B), such as when the polymeric film is hydrophilic. In the case when a coupling agent film is utilized (624) (B), a third layer may be utilized with respect to the substrate, and generally is the photocatalytic film (632) (B). Thus, the substrate generally includes a plurality of layers, the minimum requirements of which is an aluminum oxide layer and a photocatalytic layer. The photocatalytic layer is generally located near or at the top of the substrate so as to facilitate the self-cleaning functionality of the substrate.

EXAMPLES

Example 1

In Example 1, the aluminum alloy base is a 5657 alloy sheet. The substrate is cleaned via immersion in a non-etching alkaline cleaner, for example A31K from Henkel Surface Technologies, at 140° F. for 2 minutes. The base is rinsed with tap water at room temperature and is then rinsed with deionized water at room temperature. The cleaned base is anodized in 20 wt. % sulfuric acid solution at approximately 70° F. to about 90° F. for 30 minutes, using DC current with a current density of 12 Amperes/$ft^2$ (asf), and a voltage range of about 11 to about 15 volts to produce an anodic oxide zone. The anodic oxide zone is then rinsed with tap water at room temperature and is then rinsed with deionized water at room temperature and allowed to air dry. A sol containing $TiO_2$ (for example, the TPX family of coatings as sold by Kon Corporation and marketed by Green Millennium in United States and the Toto Hydrotect family of coatings marketed by Nagase Ltd. in the United States) is applied to the anodic oxide zone and is allowed to air dry to form a photocatalytically active semiconductor film. The photocatalytically active film is then sealed by immersing the substrate in 210° F. deionized water for about 30 minutes. The photocatalytically active film is then rinsed with tap water at room temperature and is then rinsed with deionized water at room temperature. The resultant substrate passes 1000 hours of QUVB testing, as defined by ASTM D4587-05 (June 2005), entitled "Standard Practice for Fluorescent UV-Condensation Exposures of Paint and Related Coatings."

Example 2

In Example 2, the aluminum alloy base is a 5657 alloy sheet. The base is cleaned via immersion in a non-etching alkaline cleanser at 140° F. for 2 minutes. The base is rinsed with tap water at room temperature and is then rinsed with deionized water at room temperature. The cleaned base is anodized in 20 wt % sulfuric acid solution with 1 wt % $TiO_2$ nanoparticles at approximately 70° F. to approximately 90° F. for 30 minutes, using DC current, with a current density of 12 asf, and a voltage range of about 11 to about 15 volts to produce an anodic oxide zone. The anodic oxide zone is then rinsed with tap water at room temperature and is then rinsed with deionized water at room temperature and allowed to air dry. A colloid containing $TiO_2$ is applied to the anodic oxide zone and allowed to air dry to form a photocatalytically active semiconductor film. A sealant film is formed by immersing the substrate in 210° F. deionized water for about 30 minutes. The sealant film is then rinsed with tap water at room temperature and is then rinsed with deionized water at room temperature. The resultant substrate passes 1000 hours of QUVB testing.

Example 3

In Example 3, the aluminum alloy base is a 5657 alloy sheet. The base is cleaned via immersion in a non-etching alkaline cleanser at 140° F. for 2 minutes. The base is rinsed with tap water at room temperature and is then rinsed with deionized water at room temperature. A colloid containing $TiO_2$ is applied to the cleaned aluminum alloy substrate and allowed to air dry to form a photocatalytically active semiconductor film. The resultant substrate passes 1000 hours of QUVB testing.

Example 4

In Example 4, the aluminum alloy base is a 6061 forged alloy. The base is cleaned via immersion in a non-etching alkaline cleaner at 140° F. for 2 minutes. The base is rinsed with tap water at room temperature and is then rinsed with deionized water at room temperature. The cleaned base is then chemically brightened by immersion in approximately a 0.05 wt % to approximately 2.7 wt % nitric acid solution and rinsed. The cleaned base is desmutted by immersion in a 50% by volume nitric acid solution, and is then rinsed. The aluminum alloy base is then anodized in a mixture of aluminum oxide and aluminum phosphate or phosphoric acid to produce an anodic oxide zone. A siloxane is applied to the anodic oxide zone, which is then allowed to air dry and cure to form a polymer film. A colloid containing $TiO_2$ particles and silica or silicon is applied to the polymer film to create a coupling agent film. The coupling agent film may be formed from compositions of the Toto Hydrotect family of coatings marketed by Nagase Ltd. in the United States. A photocatalytically active film is formed on the coupling agent film. The resultant substrate passes 1000 hours of QUVB testing.

When referring to any numerical range of values, such ranges are understood to include each and every number and/or fraction between the stated range minimum and maximum. The same applies to each other numerical property, thermal treatment practice (i.e., temperature) and/or elemental range set forth herein.

It will thus be seen that the objects set forth above, among those made apparent from the preceding description, are efficiently attained and, since certain changes may be made in carrying out the above process, in the described product, and in the construction(s) set forth without departing from the spirit and scope of the disclosure, it is intended that all matter contained in the above description and shown in the accompanying drawing(s) shall be interpreted as illustrative and not in a limiting sense.

It is also to be understood that the following claims are intended to cover all of the generic and specific features of the disclosure herein described and all statements of the scope of the disclosure which, as a matter of language, might be said to fall therebetween.

What is claimed is:

1. A substrate comprising:
   an aluminum alloy base;
   an anodic oxide zone having micropores within a surface of the aluminum alloy substrate, wherein the anodic oxide zone is substantially impermeable to contaminants;
   a polymer film located on at least a portion of the anodic oxide zone;
   a coupling agent film located on at least a portion of the polymer film; and
   a photocatalytic film located on at least a portion of the coupling agent film, wherein the photocatalytic film comprises photocatalytically active semiconductor.

2. The substrate of claim 1, wherein the coupling agent film comprises photocatalytically active semiconductor therein.

3. The substrate of claim 1, wherein the anodic oxide zone includes photocatalytically active semiconductor therein.

4. The substrate of claim 3, wherein at least some of the photocatalytically active semiconductor of the anodic oxide zone is within at least about 2 microns from the surface of the film.

5. The substrate of claim 3, wherein the photocatalytically active semiconductor comprises titanium dioxide.

* * * * *